(12) United States Patent
Vikberg et al.

(10) Patent No.: US 8,346,254 B2
(45) Date of Patent: Jan. 1, 2013

(54) METHOD FOR REGISTERING A MOBILE TERMINAL IN A MOBILE RADIO COMMUNICATION SYSTEM

(75) Inventors: Jari Vikberg, Järna (SE); Magnus Hallenstål, Täby (SE); Göran Rune, Linköping (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 452 days.

(21) Appl. No.: 12/741,333

(22) PCT Filed: Nov. 22, 2007

(86) PCT No.: PCT/SE2007/050891
§ 371 (c)(1),
(2), (4) Date: May 4, 2010

(87) PCT Pub. No.: WO2009/067061
PCT Pub. Date: May 28, 2009

(65) Prior Publication Data
US 2010/0238893 A1   Sep. 23, 2010

(51) Int. Cl.
*H04W 4/00* (2009.01)
(52) U.S. Cl. .............. 455/435.1; 455/435.2; 455/435.3; 455/466; 455/552.1; 370/328; 370/338; 370/352; 370/401; 709/203; 709/221; 709/223
(58) Field of Classification Search .............. 455/127.1, 455/127.4, 127.5, 343.1, 343.4, 343.5, 404.1, 455/404.2, 432.1, 435.1, 435.2, 435.3, 436, 455/445, 456.1, 466, 550.1, 552.1, 574; 370/311, 318, 328, 329, 331, 338, 351, 352, 370/401; 709/203, 220, 221, 223, 224; 340/7.32, 340/7.34, 7.37
See application file for complete search history.

(56) References Cited

U.S. PATENT DOCUMENTS

| | | | | |
|---|---|---|---|---|
| 7,418,252 | B2 * | 8/2008 | Erskine et al. | 455/405 |
| 2004/0192302 | A1 * | 9/2004 | Achour et al. | 455/435.1 |
| 2007/0238466 | A1 * | 10/2007 | Buckley et al. | 455/445 |
| 2009/0103455 | A1 * | 4/2009 | Balasubramanian et al. | 370/254 |

FOREIGN PATENT DOCUMENTS
WO   WO 0209454 A2   1/2002

* cited by examiner

*Primary Examiner* — Anthony Addy (57) ABSTRACT

The present invention relates to a method for registering a mobile terminal in a mobile radio communication system. The mobile radio communication system comprises at least one mobile radio communication core network and at least one IMS core network. The mobile terminal is located within a radio access network associated to the at least one mobile radio communication core network and comprises at least a first and a second periodic registration timer for respectively registering the mobile terminal with the at least one mobile radio communication core network and the at least one IMS core network upon their respective expiry. The method comprises the step of registering the mobile terminal with the mobile radio communication core network and with the at least one second network as any one of the at least first and second periodic registration timers, which is first to expire, expires.

17 Claims, 7 Drawing Sheets

METHOD FOR REGISTERING A MOBILE TERMINAL IN A MOBILE RADIO COMMUNICATION SYSTEM

TECHNICAL FIELD

The present invention relates in general to a method for registering a mobile terminal in a mobile radio communication system, and in particular to a method for efficiently registering a mobile terminal in a mobile radio communication system using a low battery power consumption.

BACKGROUND

In mobile radio communication systems or mobile radio communication networks, mobile terminals need to periodically perform different types of area update registrations. The mobile terminals perform these area update registrations for several reasons, such as, for example, to ensure that information about where a terminal is currently located is updated in the mobile radio communication system.

Also, for mobile terminals using IMS, where IMS is an acronym for IP Multimedia Subsystem, an IMS client residing in the mobile terminal may need to perform signalling towards an IMS core network, which normally include periodic registrations and presence signalling. These periodic registrations may be performed for similar reasons as for the periodic area update registrations or in order to be able to provide various IP-based services.

For a mobile terminal running an IMS client, it may follow that the mobile terminal has to perform these regular periodic registrations as each of the corresponding timers for these different periodic update registrations expire. This is a problem, since for each of these events a mobile terminal has to activate a transmitter. To repetitively activate and deactivate the transmitter as the different timers expire will inevitably lead to a short battery life time. This in turn will also lead to a reduced capacity and a short stand-by time for the mobile terminal. It may also cause the mobile terminals to use the system in a non optimal way by, for example, occupying additional system resources.

Additionally, since mobile terminals increasingly are fitted with more and more additional equipment, such as, for example, larger displays and more advanced applications, the need for and importance of saving battery life time has also increased.

SUMMARY

A problem to which the present invention relates is the problem of how to extend the battery lifetime of a mobile terminal in a mobile radio communication system. Another problem to which the present invention relates is the problem of increasing the stand-by time for a mobile terminal in a mobile communication system. A further problem to which the present invention relates is the problem of achieving a mobile terminal that uses less of the resources in a mobile communication system.

These problems are solved by a method for registering a mobile terminal in a mobile radio communication system, said mobile radio communication system comprising at least one mobile radio communication core network and at least one IMS core network, wherein said mobile terminal is located within a radio access network associated to the at least one mobile radio communication core network and comprises at least a first and a second periodic registration timer for respectively registering the mobile terminal with the at least one mobile radio communication core network and the at least one IMS core network upon their respective expiry. The method is characterized by the step of registering the mobile terminal with the mobile radio communication core network and with the at least one second network as any one of the at least first and second periodic registration timers, which is first to expire, expires.

The object of the present invention is further achieved by a method for registering a mobile terminal in a mobile radio communication system, said mobile radio communication system comprising at least one mobile radio communication core network connected to at least one second network, wherein said mobile terminal is located within a radio access network associated to the at least one mobile radio communication core network and comprises at least a first and a second periodic registration timer for respectively registering the mobile terminal with said at least one mobile radio communication core network and said at least one second network upon their respective expiry. The method is characterized in the at least one second network upon registering the mobile terminal performs the steps of: providing at least one new timer value for at least one said second periodic registration timer that is associated with the at least one second network in said mobile terminal; transmitting a registration update subscribe message to the mobile radio communication core network, wherein the registration update subscribe message indicates to the mobile radio communication core network that the at least one second network is to be sent a registration update event by the mobile radio communication core network each time the mobile terminal update its location to the mobile radio communication core network.

The object of the present invention is also further achieved by a mobile terminal performing periodic registrations in a mobile radio communication system, the mobile radio communication system comprising at least one mobile radio communication core network connected to at least one second network, wherein the mobile terminal is located within a radio access network associated to the at least one mobile radio communication core network and comprises at least a first and a second periodic registration timer for respectively registering the mobile terminal with the at least one mobile radio communication core network and the at least one second network upon their respective expiry. The mobile terminal is characterized by a registration unit arranged to register with the mobile radio communication core network and with the at least one second network as any one of the at least first and second periodic registration timers which is first to expire expires.

The object of the present invention is also further achieved by a network node for registering a mobile terminal in at least one second network, wherein the at least one second network is connected to at least one mobile radio communication core network, the network node is characterized by a transceiver arranged to upon registering the mobile terminal in the at least one second network transmit at least one new timer value for at least one periodic registration timer associated with the at least one second network to the mobile terminal and transmit a registration update subscribe message to the mobile radio communication core network.

The object of the present invention is also further achieved by a mobile radio communication system comprising at least one mobile radio communication core network connected to at least one second network, wherein the second network comprises a network node according to the above.

The object of the present invention is also further achieved by a computer programme product for use in a network node to register a mobile terminal in at least one second network, wherein the at least one second network is connected to at least one mobile radio communication core network, wherein the network node comprises computer readable code means, which when run in the network node causes the network node to upon registering the mobile terminal in the at least one second network provide at least one new timer value to at least one periodic registration timer associated with the at least one second network in the mobile terminal and transmit a registration update subscribe message in order to subscribe to registration or signalling updates from the mobile radio communication core network.

An advantage of the invention is that the registrations of the mobile terminal in the mobile radio communication system are synchronized and performed in such a way that less power is drawn from the battery as compared to conventional independent mobile terminal registrations. Thus, the invention extends the battery lifetime of a mobile terminal in a mobile radio communication system A further advantage of the present invention is that it will also lead to an increased capacity and a longer stand-by time for the mobile terminal in a mobile radio communication system.

Another further advantage of the invention is that because of the synchronized registrations, each mobile terminal will also occupy or use less of the resources in the mobile radio communication system.

Further advantageous embodiments of the methods, the mobile terminal, the network node, the mobile radio communication system and the computer programme product are set forth in the dependent claims, which correspondently describe further advantageous embodiments of the present invention.

BRIEF DESCRIPTION OF THE DRAWINGS

The present invention will be described in more detail in the following with reference to the appended drawings, in which.

DETAILED DESCRIPTION

Figure 1:
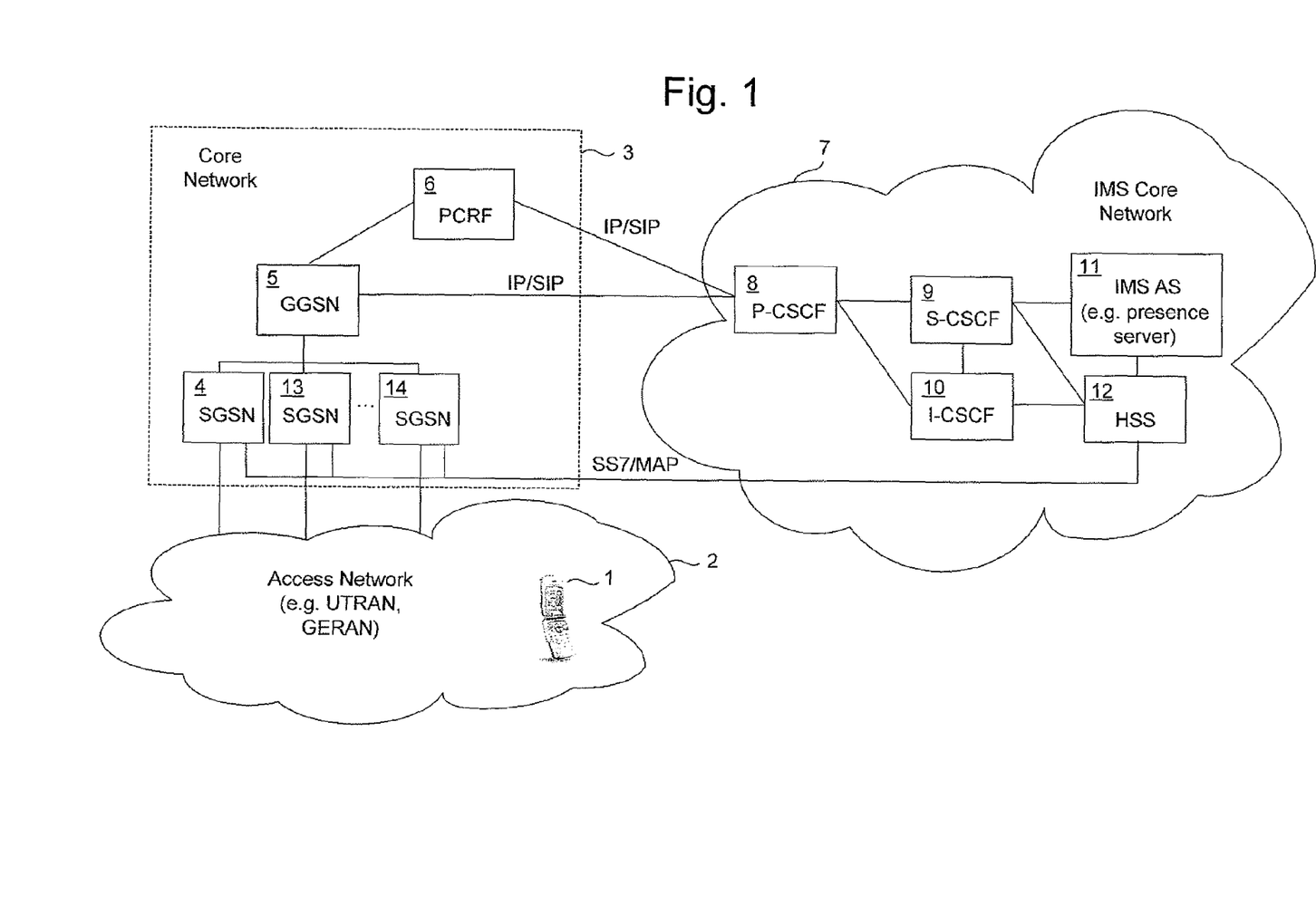
FIGS. 1 and 2 are block diagrams illustrating examples of mobile radio communication systems in which the present invention may be used.
Figure 2:
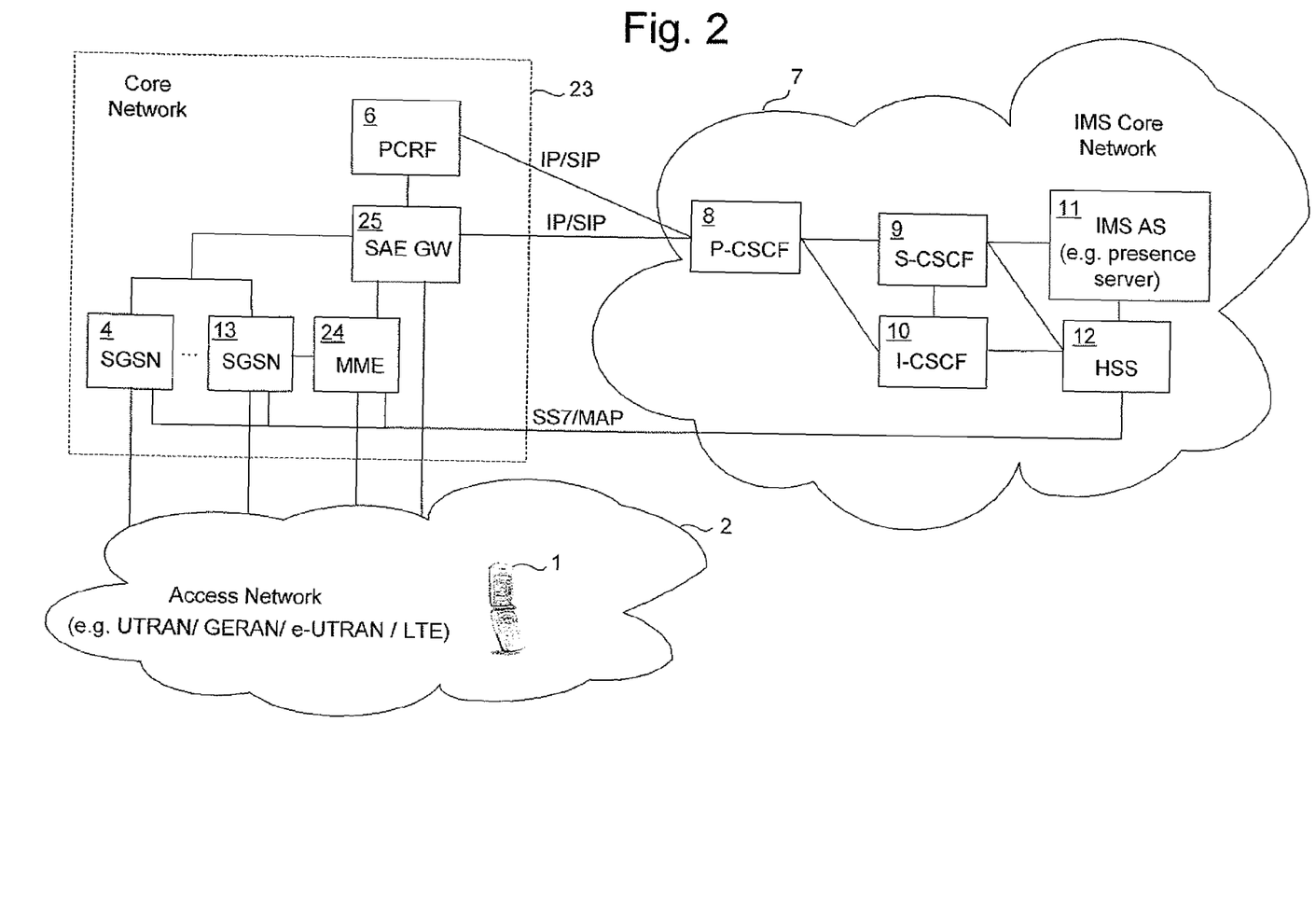

FIGS. 1 and 2 illustrates examples of mobile radio communication systems in which the present invention may be used.

In FIG. 1, a mobile terminal 1 is currently located within an access network 2 of a mobile radio communication core network 3. The mobile terminal 1 located within the access network 2 may be connected through the mobile radio communication core network 3 to an IP Multimedia Subsystem (IMS), which is illustrated in FIG. 1 as the IMS core network 7 and is described further in the following.

The access network 2 of the mobile radio communication core network 3 may be, for example, the common radio communications access networks, UTRAN (Universal Terrestrial Radio Access Network) and/or GERAN (GSM/EDGE Radio Access network). However, it should be noted that the inner structure and details of the access network 2 of the mobile radio communication core network 3 is not relevant to the object of the present invention. Therefore, although some references in the following may be made to certain entities in the access network 2, no further description of the access network 2 connected to the mobile communication core network 3 is considered necessary in describing the inventive features of the present invention.

The mobile radio communication core network 3 may comprise at least one SGSN 4 (serving GPRS support node) and at least one GGSN 5 (gateway GPRS support node). These network nodes may also be referred to as the GPRS (General Packet Radio System) core network and can be said to be wholly comprised in the prior art. Therefore, they will only be discussed briefly below. More information about the mobile communication core network may, for example, be found in the 3GPP specification TS 23.002. The mobile radio communication core network 3 may also comprise a PCRF 6 (Policy Control and Charging Rules Function).

The SGSN 4, 13, 14 may be responsible for the delivery of data packets to and from the mobile terminal 1, when the mobile terminal 1 is located within a designated geographical service area of the SGSN 4, 13, 14. The designated geographical service area of the SGSN 4, 13, 14 may consist of a number of cells in the access network 2. The location registers comprised in the SGSN 4 may store location information and user profiles (e.g., IMSI, address(es) used in the packet data network) of all GPRS users currently registered with the SGSN 4, 13, 14.

The GGSN 5 acts as an interface between the GPRS backbone network, e.g. SGSNs 4, 13 and 14, and external packet data networks. The GGSN 5 is also responsible for assigning an IP address to mobile terminal 1 and can be referred to as the IP point of presence for the mobile terminal 1.

The PCRF 6 may enforce operator policy decisions and charging rules functions for the GGSN 5 which may relate to, for example, operator QoS (Quality of Service) control and further bearer policies.

While the mobile communication core network 3 provides terminal mobility, the user mobility may be provided by the IP Multimedia Subsystem (IMS).

An IP Multimedia Subsystem (IMS) is an open, standardised, multimedia architecture for mobile and fixed IP services. The IMS provides a wide variety of services, such as, for example, multimedia telecommunication services, chat based services or other user-to-user services as well as user-to-content services. Also, the IMS may facilitate the offering of popular services such as, for example, voice over IP (VoIP), push-to-talk over cellular (POC), multiparty gaming, video-conferencing and content sharing etc.

FIG. 1 further illustrates a simplified example of an IMS core network architecture in a mobile radio communication system, wherein the present invention may be used. The IMS core network 7 in FIG. 1 is described as comprising the following nodes or entities: a P-CSCF 8 (Proxy-Call Session Control Function), a S-CSCF 9 (Serving-CSCF), an I-CSCF 10 (Interrogating-CSCF), IMS AS 11 (Application Servers), and a HSS 12 (Home Subscriber Server). It should be noted that the IMS core network 7 may also be said to comprise further nodes and entities, but is for the sake of simplicity and relevance to the present invention not described in further detail herein. It should also be noted that for the purpose of the invention only the P-CSCF 8, the IMS AS 11 and the HSS 12 will be briefly discussed below. More information about IMS, the IMS standards and the different types of nodes available therein can be found in, for example, the 3GPP specifications TS 23.228 and TS 23.002.

The P-CSCF 8 is the first point of contact for a mobile terminal 1 communicating with the IMS core network 7. Normally, the P-CSCF 8 is located within same the network as the mobile terminal's IP point of presence, that is, the same IP network as the GGSN currently associated with the mobile terminal 1. The mobile terminal 1 will discover its P-CSCF 8 as part of the attachment to the mobile radio communication core network 3, which is assigned thereto during IMS registration. The assigned P-CSCF 8 does not change for the duration of the registration.

The IMS AS 11 (IMS Application Servers) hosts and executes services. An example of an application server in IMS AS 11 is a presence server. The presence server is part of a presence service in the IMS core network 7 and may comprise a presence agent arranged to receive and publish presence information of a presentity, or a presence user agent, in the mobile terminal 1. The presence information may be attributes describing the presentity such as, for example, status and capabilities.

The HSS 12 (Home Subscriber Server) is the master user database that supports the entities or nodes in the IMS core network 7. It is arranged to contain the subscription-related information, such as, for example, user profiles and information about the physical location of a user, and may also perform authentication and authorisation of a user.

It should be noted that the present invention is applicable for use with all types of mobile networks including, for example, $2^{nd}$ generations of GSM (Global System for Mobile Communications) networks, $3^{rd}$ generation UMTS (Universal Mobile Telecommunications System) networks, transit networks such as Internet, Intranets, local area networks (LANs) and ATM based transit networks, and terminating networks such as public switched telephone networks (PSTNs) and ISDNs. Furthermore, examples of $2^{nd}$ generation GSM networks may include data networks using General Packet Radio Service (GPRS) technology for mobile data networking services and IP multimedia services, and Enhanced Data Rates for Global Evolution (EDGE) technology for high bit rate data services.

Another example of an applicable mobile network for the present invention is illustrated in FIG. 2. The mobile radio communication core network 23 in FIG. 2 is a simplified example of a mobile communication network commonly referred to as EPS (Evolved Packet System) or SAE (System Architecture Evolution). The mobile radio communication core network 23 in the EPS is referred to as the EPC (Evolved Packet Core) and the access network 2 part is referred to as the E-UTRAN (Evolved Universal Terrestrial Radio Access Network) or as the LTE (Long Term Evolution) radio access network. More information about EPS/SAE mobile communication network architecture may, for example, be found in the 3GPP specification TS 23.401.

However, discussions will be generalised to any type of mobile radio communication core network capable of providing IP multimedia services, and when specific embodiments of the present invention is described in the following, references will primarily be made to the 2G/3G packet core architecture illustrated in the mobile radio communication system of FIG. 1. Although, it is important to note that any person skilled in the art will have no difficulties in mapping the solution according to the present invention into other mobile communication networks, such as, the EPS/SAE mobile communication network.

In a mobile radio communication systems such as depicted in FIG. 1, a mobile terminal 1 has to perform registrations or signalling in order to ensure that information about where the mobile terminal 1 is currently located is continuously up-to-date and correct in the location registers of the mobile radio communication system. For example, in GSM and UMTS based mobile radio communication systems these registrations may be Location Updates (LU) performed towards, for example, an MSC (Mobile Switching Centre) that may be comprised in the circuit-switched domain of the mobile radio communication core network 3 (not shown in FIG. 1), or Routing Area Updates (RAU) performed towards the current SGSN in the packet switched domain of the mobile radio communication core network 3. In LTE/SAE based mobile communication networks, Tracking Area Updates (TAU) may correspond to the Routing Area Updates (RAU) in the mobile radio communication core network 3. Furthermore, performing these RAU registrations or signalling regularly may also be necessary in order to ensure that any loss of data in the mobile radio communication core network 3 regarding the whereabouts of mobile terminal 1, will not result in that a user of the mobile terminal 1 can not be reached for a long period of time. Data loss may occur in the mobile radio communication core network 3 due to, for example, software errors or other malfunctions. Although any loss of data may make the user of the mobile terminal 1 unable to be reached for a short period of time, it follows from the periodicity of the registrations that the mobile terminal 1 may perform the necessary RAU registration or signalling without the mobile terminal 1 having to be moved. The periodic RAU registrations or signalling may be controlled by a timer, as will be described in reference to FIG. 3, where the timer may be tuned against the likelihood of data loss and costs in terms of battery life time and the use of system resources.

Further, in a mobile terminal 1 using IMS, the IMS client residing in the mobile terminal 1 regularly performs registrations towards the IMS core network 7. These periodic IMS registrations are substantially performed for similar reasons as for the periodic RAU registrations, that is, to keep the location information of the mobile terminal 1 updated. Although, in this case, for the location registers of the entities or nodes in the IMS core network 7, such as, for example, the HSS 10 and the S-CSCF 9.

If a user of the mobile terminal 1 also wishes to use, for example, a presence service available through IMS, the IMS client comprised in the mobile terminal 1 may also need to perform periodic presence signalling in order to report its current status or "present state", and/or periodically polling the current status or "present state" of other mobile terminal users also using the presence service in IMS. The latter may, for example, be used in the mobile terminal 1 by applications in which frequent status updates are needed, such as, for example, MSN Messenger, ICQ, etc.

In a mobile terminal 1, the periodicity of the RAU registrations may be decided by an RAU registration timer, the periodicity of the IMS registrations towards the IMS core network 7 may be decided by an IMS registration timer, and the periodicity of the presence signalling/polling may be decided by an IMS presence signalling timer. As any of these timers expire; a mobile terminal 1 will activate a transmitter in order to perform the event associated with the expired timer. This will cause the mobile terminal 1 to repeatedly activate/deactivate its transmitter as each of the timers expires, respectively. For each time, the activation/deactivation will draw upon and consume battery power of the mobile terminal 1. Consequently, this will lead to a shorter battery lifetime, and furthermore to a reduced capacity and a shorter stand-by time for the mobile terminal 1. It may also cause the mobile terminals to occupy additional system resources.

According to the inventive features of the present invention, these problems may be solved in a mobile radio communication system by a mobile terminal and/or an IMS network node of which exemplary embodiments are presented in the following. The mobile terminal and/or the IMS network node may arrange the timers in such a way that the update registrations and signalling are performed synchronously and efficient.

Figure 3:
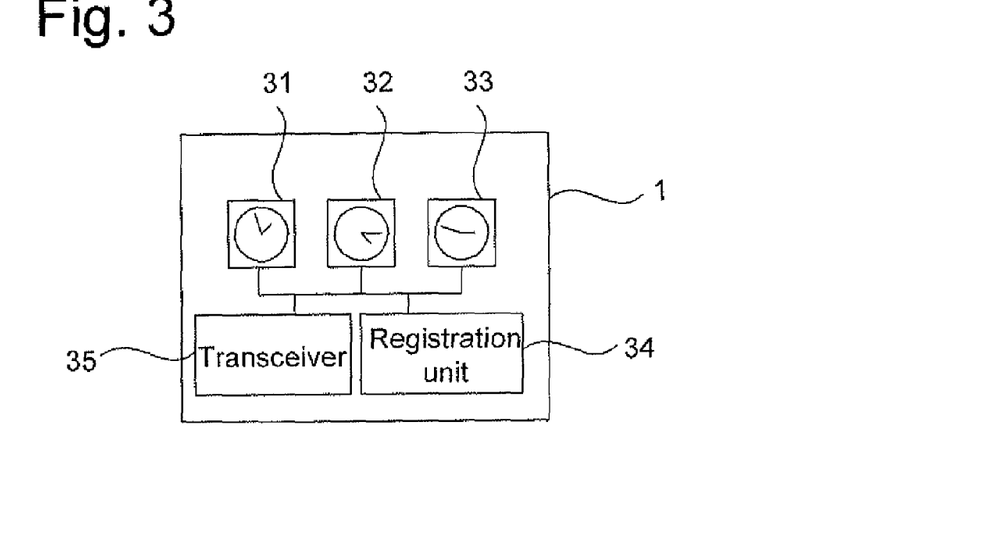
FIG. 3 is a block diagram showing a mobile terminal comprising periodic registration timers, a transceiver and a registration unit according to an embodiment of the present invention.

FIG. 3 shows a mobile terminal 1 according to an embodiment of the present invention for use in a mobile radio communication system. The mobile terminal 1 is, in this example, provided with three timers, an RAU registration update timer 31, an IMS registration timer 32 and an IMS presence signalling timer 33. In a similar manner as described above in the prior art, the expiry of any of these timers will cause the mobile terminal 1 to transmit a signal comprising the registration (or signalling) associated with the expired timer. For additional IMS services or other features of the mobile terminal 1, there may also be additional timers which also may be encompassed by the inventive operations of the present invention as, for example, for the LUs in the Access Network 2 or other periodic updates such as GAN (Generic Access Network) level Keep Alive messages as described in the 3GPP specifications TS 43.318 and 44.318. The present invention should therefore not be considered limited in respect to the number of timers. The mobile terminal 1 may also be arranged with a registration unit 34 and a transceiver 35. The registration unit 34 may be arranged to start, stop and reset all of the timers 31, 32, 33 present in the mobile terminal 1. The registration unit 34 may further be arranged to reset a timer as the mobile terminal 1 has performed a successful registration associated with that specific timer. The transceiver 35 may be arranged to receive new timer values for any of the timers 31, 32, 33. The registration unit 34 may also be arranged to set new timer values for one or each of the timers 31, 32, 33 according to the new timer values received by the transceiver 25. The mobile terminal 1 may be any device that may comprise access capabilities to a mobile radio communication system, such as a computer, laptop, palm pilot, server, gps-transmitter etc.

Figure 4:
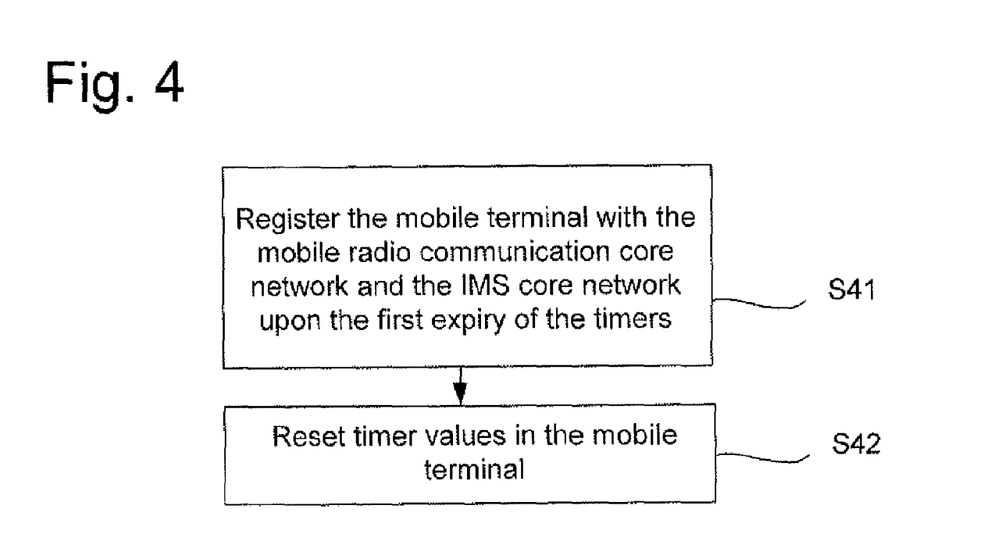
FIG. 4 is a flowchart illustrating an exemplary operation for performing registrations of a mobile terminal in a mobile radio communication system according to an embodiment of the present invention.

FIG. 4 illustrates an exemplary operation for performing synchronized registrations and updates of a mobile terminal 1 in a mobile radio communication system according to an embodiment of the present invention. In step S41, one of the timers in the mobile terminal 1 is selected, that is, the timer having the timer value with the shortest time left before expiring. As this timer expires, the mobile terminal 1 performs synchronized registrations, i.e. performs all registrations and signalling (for example a RAU registration, an IMS registration and IMS presence signalling) at the same time or in sequence without deactivating the transmitter of the mobile terminal 1, to the mobile radio communication core network 3 and the IMS core network 7. In step S42, the mobile terminal 1 may then reset the periodic registration timers 31, 32, 33 present in the mobile terminal 1. A more detailed example of these operations is described with reference to FIG. 5.

Figure 5:
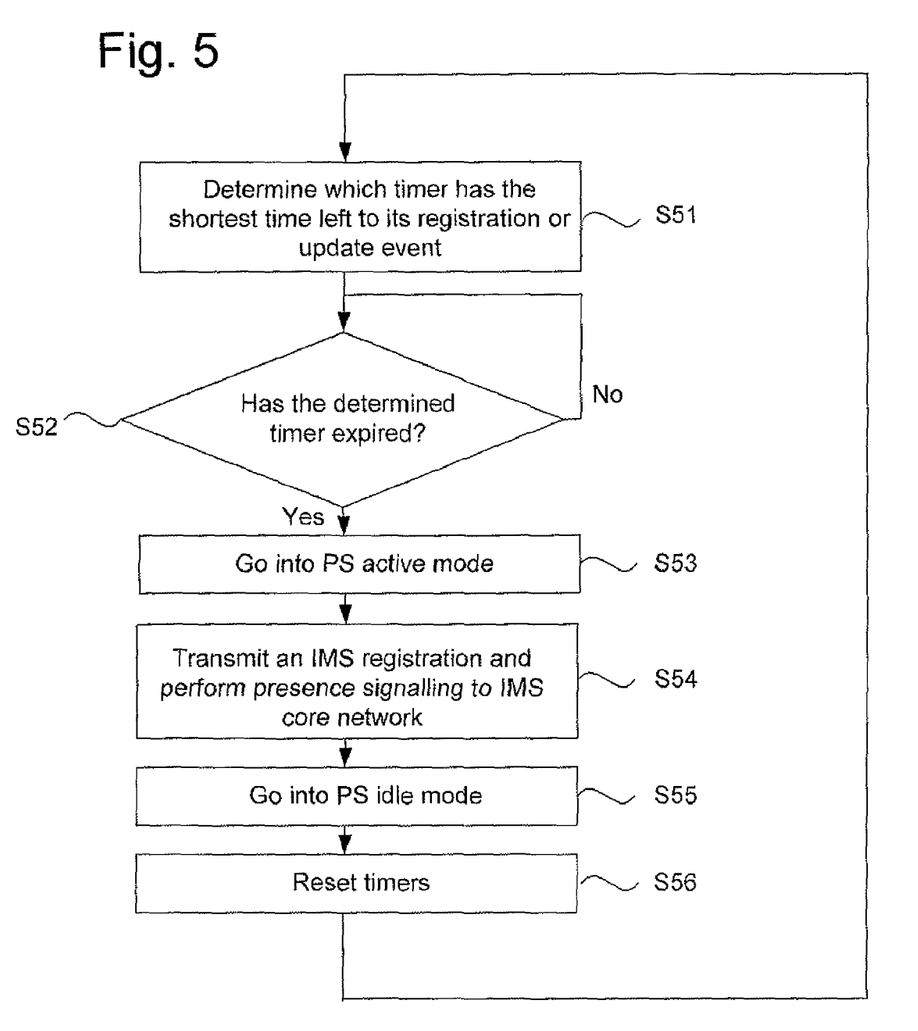
FIG. 5 is a flowchart illustrating in more detail an operation for performing registrations of a mobile terminal in a mobile radio communication system according to the embodiment of the present invention as described in FIG. 4.

FIG. 5 illustrates in more detail an operation for performing synchronized registrations and updates of a mobile terminal 1 in a mobile radio communication system according to the previous embodiment of the present invention as described with reference to FIG. 4.

In step S51, the mobile terminal 1 compares the timer values of the timers and determines which of the RAU registration timer 31, the IMS registration timer 32 and the IMS presence signalling timer 33 has the shortest time left to the next registration or signalling. In order to do so, the mobile terminal 1 may collect the timer values for each registration and update event. It should also be noted that should the mobile terminal 1 not be using the presence service in IMS, the presence signalling and the presence signalling timer 33 may be omitted. The mobile terminal 1 may obtain the timer values for the RAU registration timer 31, the IMS registration timer 32 and the IMS presence signalling timer 33 in substantially three different ways. The mobile terminal 1 may receive timer values as part of a broadcasted system information signal from access network 2 associated with the mobile radio communication core network 3 as, for example, for Location Updates (LU) in the circuit-switched domain. The mobile terminal 1 may also receive timer values using unicast signalling from the mobile radio communication core network 3 and/or from the IMS core network 7 as, for example, for the RAU registrations from the mobile radio communication core network 3. The mobile terminal 1 may also use predetermined default values present in the mobile terminal 1. In this case, the mobile terminal 1 may also suggest these predetermined default values to the associated networks in the mobile radio communication system, whereby the network associated with the predetermined default value may accept, reject and/or provide an alternative timer value. The latter is primarily used by the IMS core network 7 or other SIP networks. Additionally, there is a fourth way in which the mobile terminal 1 may obtain these timer values; that is by using user decided timers values. This fourth way, however, is mainly reserved for the timer value of the IMS presence signalling timer 33 or the like, and may be set by the user through the IMS client in the mobile terminal 1.

In step S52, the determined periodic registration timer will eventually expire. In step S53, the mobile terminal 1 then goes into packet switched active mode (PS active mode). This activates the transmitter/transceiver 26 of the mobile terminal 1. As the mobile terminal 1 in step S53 goes into PS active mode and starts transmitting, the mobile radio communication core network 3 will also go into PS active mode. In step S54, the mobile terminal 1 transmits an IMS registration through the mobile radio communication core network 3 to the P-CSCF 8 of the IMS core network 7. Upon receiving the IMS registration, the P-CSCF 8 forwards the IMS registration to other appropriate entities in the IMS core network 7, which may update its location registers for the mobile terminal 1 and re-register the mobile terminal in the IMS core network 7. Although, for example, if the mobile terminal 1 has not yet been registered in the IMS core network 7 or in the case of data loss, the re-register will be new registration of the mobile terminal in the IMS core network 7. The mobile terminal 1 may also at this time perform IMS presence signalling towards appropriate application servers IMS AS 11, such as, for example, a presence server, within the IMS core network 7.

In step S55, as the mobile terminal 1 has finished the transmission of the IMS registration and performed the IMS presence signalling towards the appropriate application servers IMS AS 11 in the IMS core network 7, the mobile terminal 1 and the mobile radio communication core network 3 goes into packet switched idle mode (PS idle mode). This deactivates the transmitter/transceiver 26 of the mobile terminal 1. In step S56, the mobile terminal 1 will then reset the RAU registration timer 31, the IMS registration timer 32 and the IMS presence signalling timer 33. The mobile terminal 1 then returns to step S51.

Advantageously, no explicit periodic RAU registration or signalling needs to be sent form, or performed by, the mobile terminal 1 to its associated SGSN 4, 13, 14 in the mobile radio communication core network 3. The SGSN 4, 13, 14 may automatically update its location register with the current location of the mobile terminal 1. This may be done based on packet switched user plane transmissions from the mobile terminal 1, for example, the mobile terminal 1 transmits the IMS registration and performs the IMS presence signalling on the packet switched plane to the P-CSCF 9 in the IMS core network 7 through its associated SGSN 4, 13, 14 and GGSN 5 in the mobile radio communication core network 3. Alternatively, a RAU registration or signalling may be sent, or performed, simultaneously with the IMS registration and the IMS presence signalling.

Figure 6:
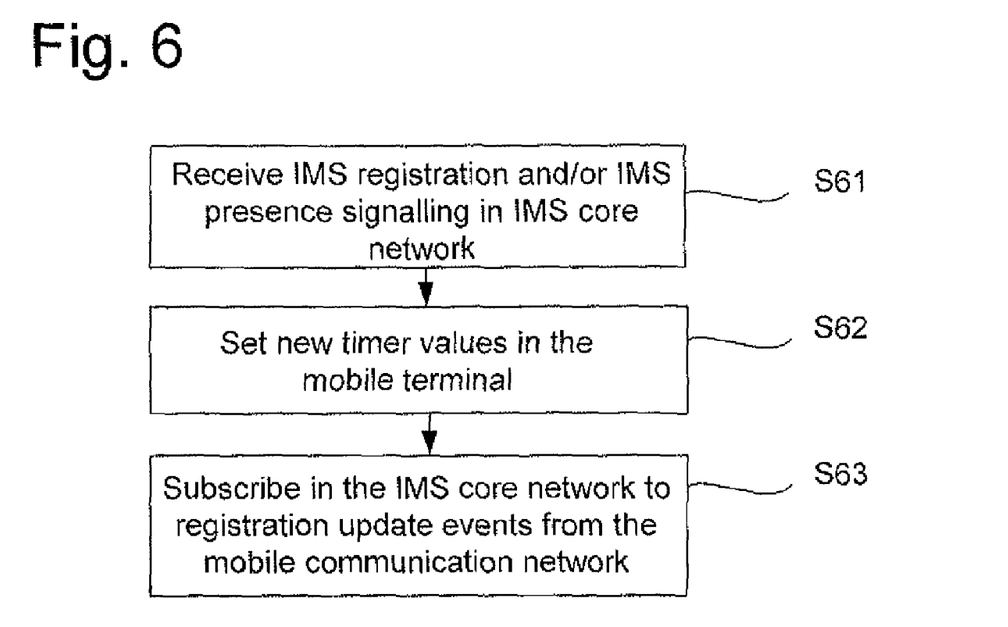
FIG. 6 is a flowchart illustrating another exemplary operation for performing registrations of a mobile terminal in a mobile radio communication system according to another embodiment of the present invention.

FIG. 6 illustrates an exemplary operation for performing synchronized registrations and updates of a mobile terminal 1 in a mobile radio communication system according to an embodiment of the present invention. Upon the expiry of either the IMS registration timer or the IMS presence signalling timer in the mobile terminal 1, the mobile terminal 1 will send an IMS registration or perform IMS presence signalling, respectively. In step S61, the IMS core network 7 will receive the IMS registration or the IMS presence signalling.

In step S62, after the IMS core network 7 has received the IMS registration or the IMS presence signalling in step S61, the P-CSCF 8 in the IMS core network 7 may be arranged to provide new timer values for some of the periodic registration timers in the mobile terminal 1, namely the IMS registration timer 32 and the IMS presence signalling timer 33. These new timer values will indicate that no IMS registrations or IMS presence signalling needs to be performed for a very long time or at all.

In step S63, the IMS core network 7 may, upon the basis of the received IMS registration or performed IMS presence signalling in step S61, be configured to automatically send a subscription message to the mobile radio communications core network 3. This may, for example, be performed by the P-CSCF 9 in the IMS core network 7. The subscription message will be received by the mobile radio communication core system 3, which then for each RAU registration or signalling made by the mobile terminal 1 to the mobile radio communication core system 3 will forward an update message to the IMS core network 7 indicating that a RAU registration or signalling has been made by the mobile terminal 1 to the mobile radio communication core system 3. The update message forwarded from the mobile radio communication core system 3 may comprise all the information necessary for the IMS core network 7 to register the mobile terminal 1 within the IMS core network 7. The IMS core network 7 may therefore also be configured to register the mobile terminal 1 or keep the mobile terminal 1 registered in the IMS core network 7 in response to the update messages sent from the mobile radio communication core network 3. This may be facilitated by the P-CSCF 8 in the IMS core network 7. A more detailed example of these operations is described with reference to FIG. 7.

Figure 7:
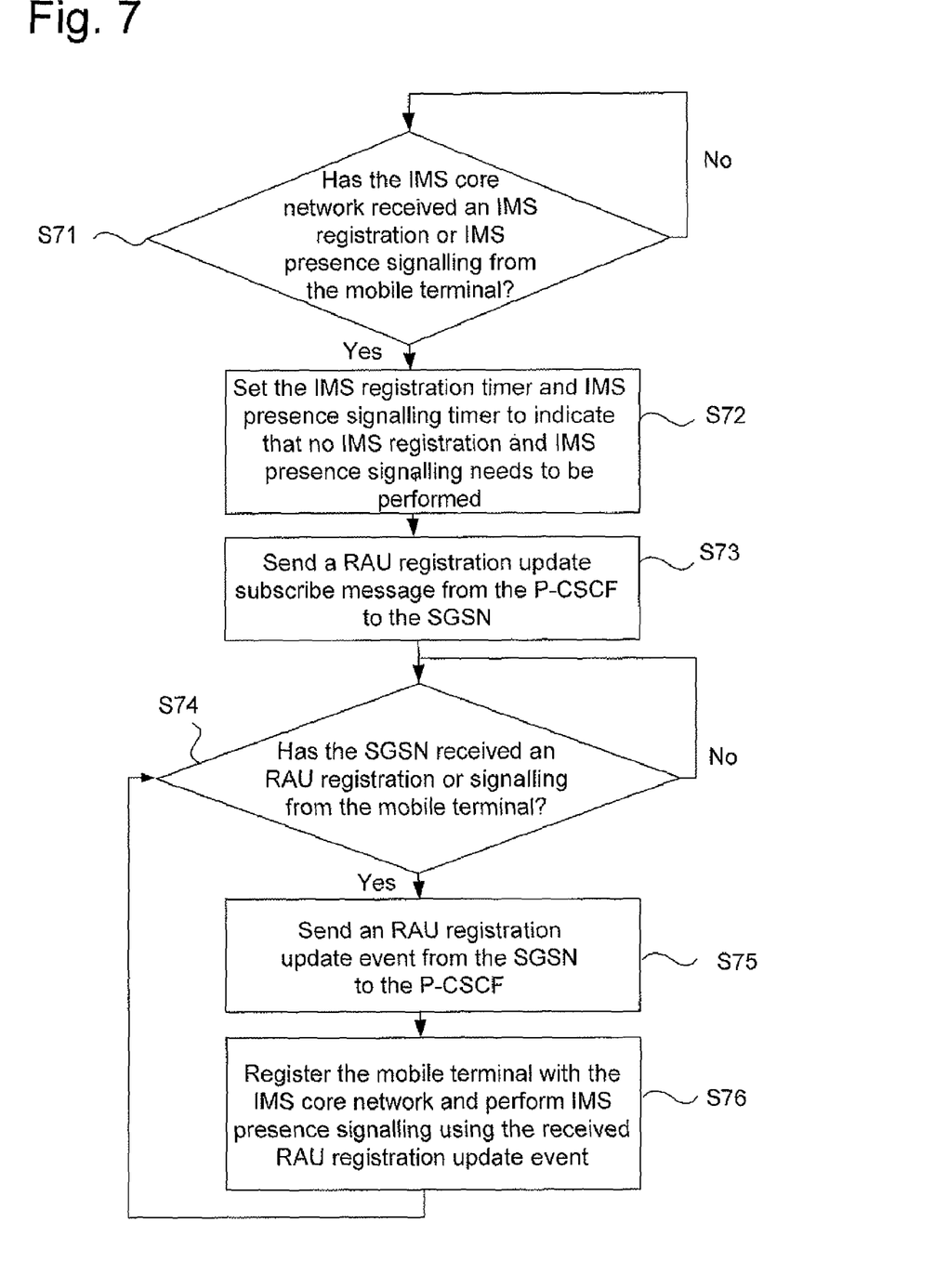
FIG. 7 is a flowchart illustrating in more detail an operation for performing registrations of a mobile terminal in a mobile radio communication system according to the embodiment of the present invention as described in FIG. 6.
Figure 8:
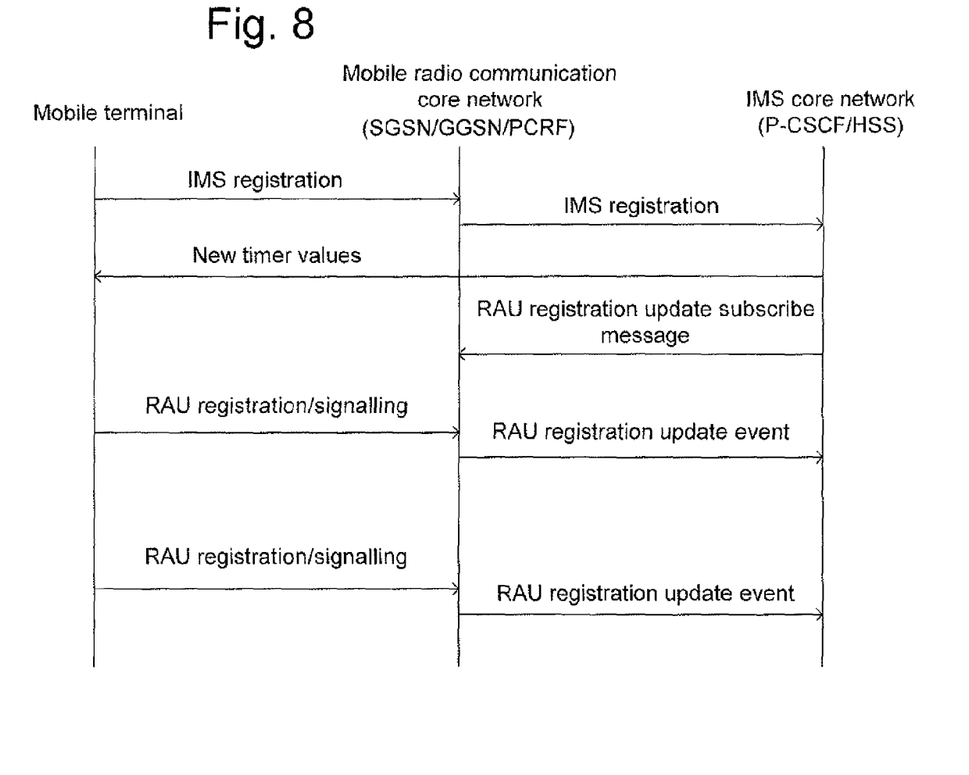
FIG. 8 illustrates a signalling diagram between a mobile terminal, a mobile radio communication core network and an IMS core network according to the exemplary embodiments of the present invention as described in FIGS. 6 and 7.

FIG. 7 illustrates in more detail an operation for performing synchronized registrations and updates of a mobile terminal 1 in a mobile radio communication system according to the previous embodiment of the present invention in FIG. 6. The mobile terminal 1 may perform the operation described in the previous embodiments in reference to FIGS. 4 and 5, together with the operation described according to the embodiment presented below. Alternatively, the mobile terminal 1 may also remain functionally unaffected, that is, perform the conventional periodic registrations and signalling as each of the corresponding timers expires. The signalling diagram in FIG. 8 also gives an overview example of the signalling that may occur according to the operation of FIGS. 6 and 7.

As, for example, the IMS registration timer 32 of the mobile terminal 1 expires, the mobile terminal 1 may transmit an IMS registration to the P-CSCF 8 of the IMS core network 7. The expired timer may also be, for example, the IMS presence signalling timer 33, which may cause the mobile terminal 1 to perform IMS presence signalling with an appropriate applications server IMS AS 11 in the IMS core network 7. It may also be the timer of the previous embodiments in reference to FIG. 4 or 5, which may cause the mobile terminal 1 to both transmit an IMS registration and perform IMS presence signalling to the P-CSCF 8 and the appropriate application server IMS AS 11 in the IMS core network 7. In step S71, any one or both of the IMS registration or the IMS presence signalling may reach and be received by the IMS core network 7.

In step S72, the P-CSCF 8 in the IMS core network 7 may be arranged to provide the IMS registration timer 32 and the IMS presence signalling timer 33 with new values indicating that no IMS registrations or IMS presence signalling needs to be performed by the mobile terminal 1 for a very long time or at all in dependence of these timers. This may be done by, for example, setting the IMS registration timer 32 and the IMS presence signalling timer 33 to very large values, or to empty or null values.

In step S73, the P-CSCF 8 in the IMS core network 7 sends a RAU registration update subscribe message to the SGSN 4, 13, 14 associated with the mobile terminal 1 in the mobile radio communication core network 3. This will let the associated SGSN 4, 13, 14 know that from now on the P-CSCF 8 wants to be notified every time the associated SGSN 4, 13, 14 receives an RAU registration from the mobile terminal 1. Alternatively, before the RAU registration update subscribe message ends up in the associated SGSN 4, 13, 14 of the mobile radio communication core network 3, it may be sent from the P-CSCF 9 through the PCRF 6 before making its way to the GGSN 5, and thus subsequently the associated SGSN 4, 13, 14. Another alternative is for the RAU registration update subscribe message to be sent from the P-CSCF 8 to the HSS 12 or from the P-CSCF 8 through the S-CSCF 9 to the HSS 12. The HSS 12 may then forward the RAU registration update subscribe message to the associated SGSN 4, 13, 14.

In step S74, as the RAU registration timer 31 expires, the associated SGSN 4, 13, 14 will receive a RAU registration from the mobile terminal 1. The RAU registration timer 31 in the mobile terminal 1 may be configured with a predetermined timer value for the periodic RAU registration or may receive timer values from the mobile radio communication core network 3, as previously mentioned above. Because of the step S72, wherein new timer values for the IMS registration timer 32 or the IMS presence signalling timer 33 were provided, the RAU registration timer 31 will for all instances in this embodiment, be the selected timer or always have a smaller value than the IMS registration timer 32 or the IMS presence signalling timer 33. Therefore, no signalling will be performed by the mobile terminal 1 until the RAU registration timer 31 expires.

In step S75, upon receiving the RAU registration from the mobile terminal 1 in step S74, the associated SGSN 4, 13, 14 in the mobile radio communication core network 3 may send a RAU registration update event to the P-CSCF 8 in the IMS core network 7.

Alternatively, if a PCRF 6 was present in step S73, the associated SGSN 4, 13, 14 in the mobile radio communication core network 3 may send the RAU registration update event through the PCRF 6 via the GGSN 4, 13, 14. Another alternative is if the associated SGSN 4, 13, 14 received the RAU registration update subscribe message from the HSS 12 in step S73. Then, the associated SGSN 4, 13, 14 may send the RAU registration update event to the HSS 12, which may forward the RAU registration update event to the P-CSCF 8 and other relevant nodes or entities in the IMS core network 7.

It should also be noted that another instance when the associated SGSN 4, 13, 14 in the mobile radio communication core network 3 may send a RAU registration update event to the IMS core network 7, may be, instead of receiving a RAU registration from the mobile terminal 1 as in step S74, when the associated SGSN 4, 13, 14 in the mobile radio communication core network 3 detects a packet switched user plane transmission from the mobile terminal 1. To in this way trigger a RAU registration update event to be sent to the IMS core network 7 may be used when no explicit periodic RAU registration or signalling is sent or performed, as described in the previous embodiments in reference to FIGS. 4 and 5, from the mobile terminal 1 to its associated SGSN 4, 13, 14, but as long as the mobile terminal 1 is transmitting on the packet switched user plane.

In step S76, the P-CSCF 8 in the IMS core network 7 may use the RAU registration update event to register the mobile terminal 1 with the IMS core network 7 and/or perform presence signalling towards an appropriate application server IMS AS 11 in the IMS core network 7. The mobile radio communication core network 3 and the IMS core network 7 will then wait for the next RAU registration and the next RAU registration update event, respectively and thereby return to step S74. Again, since the RAU registration timer 31 will expire first of the periodic timers 31, 32, 33 in the mobile terminal 1, the steps S74-S76 will be continuously iterated. In conclusion, the mobile terminal 1 will, as it performs its periodic RAU registration to the mobile radio communication core network 3, therefore automatically also register with the IMS core network 7 and/or perform IMS presence signalling towards an appropriate application server IMS AS 11 in the IMS core network 7.

Figure 9:
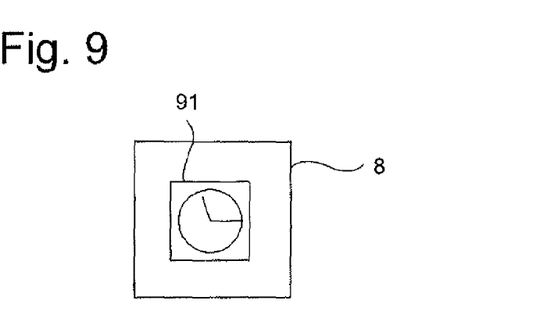
FIG. 9 is a block diagram illustrating a network node according to an embodiment of the present invention.

In order to perform the signalling described above the IMS network node P-CSCF 8 may comprise the following inventive features according to the present invention, and is also depicted in FIG. 9.

The P-CSCF 8 may be arranged to transmit RAU registration update subscribe messages to the SGSN 4, 13, 14 associated with the mobile terminal 1 in the mobile radio communication core network 3. The P-CSCF 8 may further be arranged to transmit RAU registration update subscribe messages to the SGSN 4, 13, 14 through the PCRF 6. The P-CSCF 8 may also be arranged to transmit RAU registration update subscribe messages to the HSS 12 and thus subscribe to RAU registration update events from the HSS 12.

The P-CSCF 8 may be arranged to provide new timer values for the IMS registration timer 32 and the IMS presence signalling timer 33. It should also be noted that this may also be performed by the P-CSCF 8 by, for example, accepting timer values suggested from the mobile terminal 1, for example, from an IMS client present in the mobile terminal 1, or by receiving new timer values from the applications servers IMS AS 11.

Additionally, the P-CSCF 8 in FIG. 9 may comprise a subscription timer 91 that may be arranged to indicate upon expiry that a RAU registration update event has not been received for a predetermined period of time, and that a RAU registration update subscribe message therefore is to be re-sent by the P-CSCF 9 in the IMS core network 7 to the mobile radio communication core network 3.

According to a further embodiment the subscription timer 91 may be used by the P-CSCF 8 in the IMS core network 7 to detect that the mobile terminal 1 has left the coverage area of the mobile radio communication core network 3, since the mobile terminal 1 no longer performs RAU registration or signalling updates nor is transmitting on the packet switched user plane. The P-CSCF 8 may then deregister the mobile terminal 1 in the IMS core network 7.

In addition, if the mobile terminal 1 moves between different coverage areas within the Access Network 2, wherein one coverage area may be served by the SGSN 4 and another coverage area may be served by the SGSN 13 or 14 in the mobile radio communication core network 3, the SGSN 4 may be arranged to inform the P-CSCF 8 in the IMS core network 7 of said change. It should also be noted that the other SGSN also may belong to another mobile radio communication core network than the mobile radio communication core network 3. As the P-CSCF 8 in the IMS core network 7 receives notice from the SGSN 4 that the mobile terminal 1 has moved into another coverage area served by another SGSN, the P-CSCF 8 may be arranged to send a new RAU registration update subscribe message to the new SGSN 4 currently associated with the mobile terminal 1.

Alternatively, as the mobile terminal 1 moves from one coverage areas within the Access Network 2 served by the SGSN 4 and into another coverage area served by the SGSN 13 or 14, the SGSN 4 may be arranged to transfer the RAU registration update event subscription of the P-CSCF 9 in the IMS core network 7 from the former SGSN 4 to the new SGSN 13, or 14, currently serving the mobile terminal 1. Transferring the RAU registration update event subscription from the former SGSN 4 to the new SGSN 13 or 14 may be done as an integral part of context transfer from the former SGSN 4 to the new SGSN 13 or 14. The transfer may also be done as part of the signalling between the new SGSN 13 or 14 and the IMS core network 7, as the new SGSN 13 or 14 informs the IMS core network 7 that the current SGSN for the mobile terminal 1 has changed.

By performing the above described methods and operations according to the present invention, the mobile terminal 1 and/or the inventive IMS network node (i.e. the P-CSCF in FIG. 9) may synchronizes the RAU registrations with the IMS registrations and the IMS presence signalling. This results in that unnecessary activation/deactivation of the mobile terminals transmitter/transceiver 25 is avoided. This will also lead improved battery life time, which in turn also will lead to an improved capacity and a longer stand-by time for the mobile terminal 1. Additionally, this will advantageously also lead to synchronized states in the IMS core network 7 and the mobile radio communication core network 3.

It may also be noted that a further advantage is that the above described methods and operations according to the present invention will also reduce the time during which the mobile terminal 1 occupies or uses resources in the mobile radio communication system. Therefore, use of the present invention may free normally occupied system resources for other intents and purposes.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:

1. A method for registering a mobile terminal in a mobile radio communication system, said mobile radio communication system comprising at least one mobile radio communication core network connected to at least one second network, wherein said mobile terminal is located within an access network associated to the at least one mobile radio communication core network and comprises at least a first and a second periodic registration timer for respectively registering the mobile terminal with said at least one mobile radio communication core network and said at least one second network upon their respective expiry, the method comprising the step of:
   registering said mobile terminal with said mobile radio communication core network and with said at least one second network upon expiry of any one of said at least first and second periodic registration timers which is first to expire, wherein
      said registration of the mobile terminal associated with said at least first periodic registration timer is a routing area update (RAU) registration or signaling intended for said at least one mobile radio communication core network, and
      said registration of the mobile terminal associated with said at least second periodic registration timer is an Internet Protocol (IP) Multimedia Subsystem (IMS) registration and/or IMS presence signaling intended for said at least one second network, wherein said at least one second network is an IMS core network.

2. The method according to claim 1, further comprising the step of:
   resetting said at least first and second periodic registration timers to their predetermined values as said mobile terminal registers with said mobile radio communication core network and said at least one second network.

3. A method for registering a mobile terminal in a mobile radio communication system, said mobile radio communication system comprising at least one mobile radio communication core network connected to at least one second network, wherein said mobile terminal is located within an access network associated to the at least one mobile radio communication core network and comprises at least a first and a second periodic registration timer for respectively registering the mobile terminal with said at least one mobile radio communication core network and said at least one second network upon their respective expiry, wherein said at least one second network upon registering said mobile terminal within said at least one second network performs the steps of:
   providing at least one new timer value for at least said second periodic registration timer that is associated with said at least one second network in said mobile terminal;
   transmitting a registration update subscribe message to said mobile radio communication core network, wherein said registration update subscribe message indicates to said mobile radio communication core network that said at least one second network is to be sent a registration update event by said mobile radio communication core network each time the mobile terminal updates its location to said mobile radio communication core network, wherein
      said registration of the mobile terminal associated with said at least first periodic registration timer is a Routing Area Update (RAU) registration or signaling intended for said at least one mobile radio communication core network, and
      said registration of the mobile terminal associated with said at least second periodic registration timer is an Internet Protocol (IP) Multimedia Subsystem (IMS) registration and/or IMS presence signaling intended for said at least one second network, wherein said at least one second network is an IMS core network.

4. The method according to claim 3, further comprising the step of:
   registering said mobile terminal in said at least one second network upon receiving a registration update event from said mobile radio communication core network.

5. The method according to claim 4, further comprising the step of:
   resetting said at least first periodic registration timer associated with said mobile radio communication core network to a predetermined value as said mobile terminal registers with said at least one mobile radio communication core network.

6. The method according to claim 3, wherein said at least one new timer value indicates that no registrations of the mobile terminal need to be performed in dependence of said at least one second periodic registration timer associated to said at least one second network.

7. The method according to claim 3, wherein said at least one second network is an Internet Protocol (IP) Multimedia Subsystem (IMS) core network.

8. A mobile terminal configured to perform periodic registrations in a mobile radio communication system, said mobile radio communication system comprising at least one mobile radio communication core network connected to at least one second network, wherein said mobile terminal is located within an access network associated to the at least one mobile radio communication core network and said mobile terminal comprises:
   at least a first and a second periodic registration timer for respectively registering the mobile terminal with said at least one mobile radio communication core network and said at least one second network upon their respective expiry; and
   a registration unit configured to register with said mobile radio communication core network and with said at least one second network upon expiry of any one of said at least first and second periodic registration timers which is first to expire, wherein
      said registration of the mobile terminal associated with said at least first periodic registration timer is a routing area update (RAU) registration or signaling intended for said at least one mobile radio communication core network, and
      said registration of the mobile terminal associated with said at least second periodic registration time is an Internet Protocol (IP) Multimedia Subsystem (IMS) registration and/or IMS presence signaling intended for said at least one second network, wherein said at least one second network is an IMS core network.

9. The mobile terminal according to claim 8, wherein said registration unit is further arranged to reset said at least first and a second periodic registration timers in the mobile terminal.

10. The mobile terminal according to claim 8, further comprising:
a transceiver configured to receive at least one new timer value for said at least first and second periodic registration timers.

11. A network node for use in registering a mobile terminal in at least one second network, wherein said at least one second network is connected to at least one mobile radio communication core network, wherein said mobile terminal is located within an access network associated to the at least one mobile radio communication core network and comprises at least a first and a second period registration timer for respectively registering the mobile terminal with said at least one mobile radio communication core network and said at least one second network upon their respective expiry, the network node configured to:
upon registering said mobile terminal in said at least one second network provide at least one new timer value to at least said second periodic registration timer associated with said at least one second network in said mobile terminal and transmit a registration update subscribe message in order to subscribe to registration or signalling updates from said mobile radio communication core network, wherein
registration of the mobile terminal associated with said at least first periodic registration timer associated with said at least one mobile radio communication code network is a routing area update (RAU) registration or signaling intended for said at least one mobile radio communication core network, and
said registration of the mobile terminal associated with said at least second periodic registration timer associated with said at least one second network is an Internet Protocol (IP) Multimedia Subsystem (IMS) registration and/or IMS presence signaling intended for said at least one second network, wherein said at least one second network is an IMS core network.

12. The network node according to claim 11, further configured to:
register said mobile terminal with said at least one second network in response to receiving a registration update event from said mobile radio communication core network.

13. The network node according to claim 12, comprising:
a subscription timer configured to indicate upon expiry that a registration update subscribe message is to be re-sent by said at least one second network to the mobile radio communication core network.

14. The network node according to claim 12, comprising:
a subscription timer configured to indicate that the mobile terminal has left the coverage area of the mobile radio communication core network,
whereby said network node deregisters said mobile terminal in said at least one second network.

15. The network node according to claim 11, wherein said network node is a Proxy-Call Session Control Function (P-CSCF) node in an Internet Protocol (IP) Multimedia Subsystem (IMS) core network.

16. A mobile radio communication system comprising at least one mobile radio communication core network connected to at least one second network, wherein said second network comprises a network node according to claim 11.

17. A non-transitory computer readable storage medium comprising computer-readable instructions, when executed by a processor, are configured for:
registering a mobile terminal in at least one second network, wherein said at least one second network is connected to at least one mobile radio communication core network, wherein said mobile terminal is located within an access network associated to the at least one mobile radio communication core network and comprises at least a first and a second periodic registration timer for respectively registering the mobile terminal with said at least one mobile radio communication core network and said at least one second network upon their respective expiry;
upon registering said mobile terminal in said at least one second network provide at least one new timer value to at least said second periodic registration timer associated with said at least one second network in said mobile terminal and transmit a registration update subscribe message in order to subscribe to registration or signalling updates from said mobile radio communication core network, wherein
registration of the mobile terminal associated with said at least first periodic registration timer associated with said at least one mobile radio communication code network is a routing area update (RAU) registration or signaling intended for said at least one mobile radio communication core network, and
said registration of the mobile terminal associated with said at least second periodic registration timer associated with said at least one second network is an Internet Protocol (IP) Multimedia Subsystem (IMS) registration and/or IMS presence signaling intended for said at least one second network, wherein said at least one second network is an IMS core network.

* * * * *

UNITED STATES PATENT AND TRADEMARK OFFICE
CERTIFICATE OF CORRECTION

PATENT NO. : 8,346,254 B2  
APPLICATION NO. : 12/741333  
DATED : January 1, 2013  
INVENTOR(S) : Vikberg et al.

Page 1 of 1

It is certified that error appears in the above-identified patent and that said Letters Patent is hereby corrected as shown below:

In the Specification

In Column 6, Line 59, delete "HSS 10" and insert --HSS 12--, therefor.

In Column 7, Line 55, delete "transceiver 25." and insert --transceiver 35.--, therefor.

In Column 9, Line 16, delete "form," and insert --from,--, therefor.

In Column 9, Line 24, delete "P-CSCF 9" and insert --P-CSCF 8--, therefor at each occurrence throughout the specification.

In Column 11, Line 17, delete "GGSN" and insert --SGSN--, therefor.

In Column 12, Line 62, delete "transceiver 25" and insert --transceiver 35--, therefor.

In the Claims

In Column 13, Line 30, in Claim 1, delete "timers" and insert --timers,--, therefor.

In Column 14, Line 55, in Claim 8, delete "timers" and insert --timers,--, therefor.

Signed and Sealed this  
Sixteenth Day of July, 2013

Teresa Stanek Rea  
*Acting Director of the United States Patent and Trademark Office*